United States Patent [19]

Hunt

[11] Patent Number: 5,111,196
[45] Date of Patent: May 5, 1992

[54] ELECTRONIC INFORMATION DISPLAY MODULE AND CONNECTOR THEREFOR

[75] Inventor: Peter F. Hunt, Paramount, Calif.

[73] Assignee: ESL, Inc., Olathe, Kans.

[21] Appl. No.: 28,737

[22] Filed: Mar. 23, 1987

[51] Int. Cl.$^5$ .............................................. G09G 3/20
[52] U.S. Cl. ................... 340/825.35; 340/756; 235/383
[58] Field of Search ............... 340/700, 756, 765, 706, 340/825.35, 815.04; 235/383, 375, 385; 364/464, 403, 465; 40/448, 450, 451, 5

[56] References Cited

U.S. PATENT DOCUMENTS

| | | | |
|---|---|---|---|
| 3,409,859 | 11/1968 | Krohbiel | 439/357 |
| 4,002,886 | 1/1977 | Sundelin | 235/383 |
| 4,139,149 | 2/1979 | Crepeau et al. | 235/383 |
| 4,500,880 | 2/1985 | Gomersall et al. | 340/825.35 |
| 4,654,514 | 3/1987 | Watson et al. | 235/383 |

Primary Examiner—Alvin E. Oberley
Assistant Examiner—Richard Hjerpe
Attorney, Agent, or Firm—Kokjer, Kircher, Bowman & Johnson

[57] ABSTRACT

An independent, stand-alone, battery powered information display module to visually display computer generated, alpha-numeric information on one or more liquid crystal displays. The module has particular application for storing and displaying pricing and related information associated with a shelf item commonly offered for sale in a retail establishment, such as a grocery store, or the like. Pricing information is supplied by a computer to the price display module for storage and eventual display by way of a hand-held, portable data terminal. The portable data terminal is electrically connected to the display module by a multi-terminal connector, whereby electrical contact pins of the connector are aligned for engagement with respective electrical contact strips located at the face of the display module and connected to the memory thereof. A multi-conductor electrical cable extends from the contact pins of the connector to be coupled to the portable data terminal to permit the two-way transfer of information between the memory of the display module and the computer.

8 Claims, 5 Drawing Sheets

TO PORTABLE
DATA TERMINAL

TO PORTABLE
DATA TERMINAL

ELECTRONIC INFORMATION DISPLAY MODULE AND CONNECTOR THEREFOR

BACKGROUND OF THE INVENTION

1. Field of the Invention

This invention is directed to an independent, stand-alone, self-powered information display module which is capable of storing and displaying computer generated data corresponding to the price and related information regarding items of merchandise offered for sale in retail establishments, such as a grocery store, or the like.

2. Prior Art

In the past, a price indicating label was commonly affixed to items of merchandise sold in grocery stores. Thus, a consumer could easily ascertain the price of the item by merely locating the price label thereon. The advent of electronic, point-of-sale cash register-computers with associated optical scanners has expedited the identification and pricing of items at grocery store check out stands. Thus, the price indicating label has been frequently eliminated and replaced by a product bar code. The bar code is scanned at the check out stand and decoded by the electronic cash register, which prints out a description of the item and the corresponding price. A similar product bar code and related pricing information are printed on a label that is affixed to the shelf adjacent the item to which such information relates. However, because of a sale, product scarcity, manufacturer's discount, and similar economic factors, a change in price of the shelf item may be necessitated. To accomplish a price change at the shelf, grocery store personnel must peel off and replace the original price label with a new label. Such a task is usually time consuming, laborious, and costly, in terms or man hours, especially when an item undergoes frequent price changes. In some cases, human error may result in the affixation of the wrong or incorrectly marked label to the shelf. In other cases, grocery store personnel may forget, altogether, to make the appropriate price change.

As a consequence of the foregoing, the consumer will be misinformed as to the actual price of the item to be purchased. Moreover, the price printed at the check out stand will be different than the actual purchase price of the item, leading to a possible overcharge of the consumer. What is more, because of statutory regulations in many areas, such incorrect pricing could result in a relatively severe monetary fine being levied against the grocery store or retail establishment.

One attempt to resolve the difficulty in making accurate and timely price changes to shelf items has included a price display unit to be located at the shelf on which the item is offered for sale. Information regarding the price of an item is visually displayed to the consumer by the price display unit. Pricing information and power are commonly provided by way of hard wire connections between a central computer and power source and each of the display units. Such a system requires a complex transmission and coupling arrangement which is both expensive to implement and difficult to maintain. Additionally, the information to be provided by the conventional price display unit limited in terms of content and suitability to establishments other than a grocery store.

Examples of conventional price display units may be found by referring to one or more of the following U.S. Pat. Nos.:

| | |
|---|---|
| 4,002,886 | January 11, 1977 |
| 4,500,880 | February 19, 1985 |
| 4,521,677 | June 4, 1985 |

SUMMARY OF THE INVENTION

In general terms, an independent, stand-alone battery powered display module is disclosed to store and display information generated by a computer and supplied to the display module by a hand-held, portable data terminal. The display module may be used in a retail establishment, such as a grocery store, for indicating price and other information regarding an item of merchandise. The display module may also be used in a hospital to indicate a patient's status and medication already administered or scheduled to be administered.

The display module includes a memory for storing the computer-generated information that is supplied thereto by the portable data terminal. The display module also includes a plurality of parallel aligned electrical contact strips which extend along the face of the module for connection to the memory thereof. The memory of the display module is accessed and updated by way of the contact strips. One or more liquid crystal, alpha-numeric displays are associated with the display module to display information stored in the memory.

Also disclosed is a multi-terminal connector by which to electrically interface the display module with the portable data terminal. The connector is positioned and retained over the face of the display module, such that a plurality of spring-loaded electrical contact pins which project from the connector are aligned for engagement with respective contact strips of the display module. A multi-conductor electrical cable extends from the contact pins of the connector for connection at a suitable receptacle of the portable data terminal. Positioning the connector over the face of the display module and connecting the cable to the portable data terminal completes an electrical circuit and permits the two-way transfer of information between the data terminal and the memory of the display module by way of the contact pains of the connector and the contact strips of the module. By virtue of the temporary interface established between the portable data terminal and the display module by means of the disclosed connector, information stored in the memory of the display module may be easily and accurately updated to reflect new computer-generated information for storage and subsequent display.

DESCRIPTION OF THE PREFERRED EMBODIMENT

Figure 1:
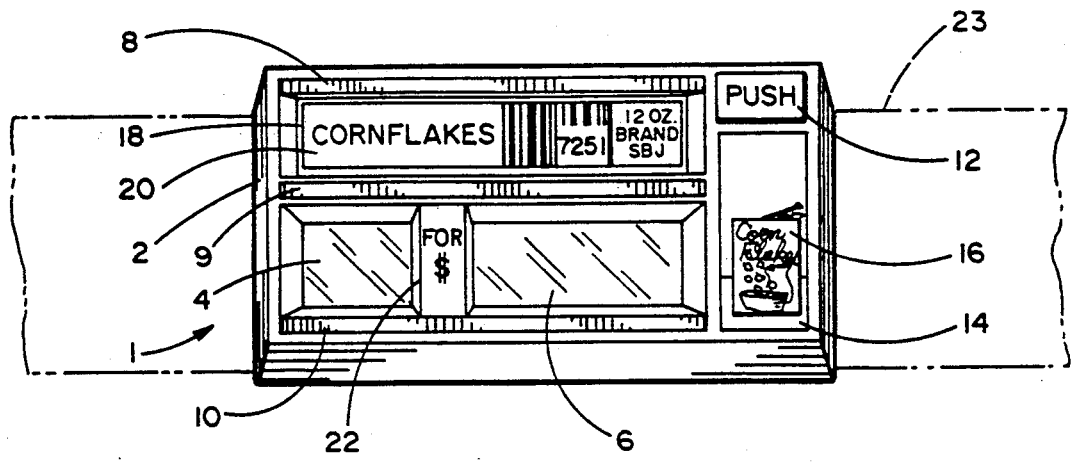
FIG. 1 is a front view of an information display module which forms the present invention.

The independent, battery powered, stand-alone, electronic information display module which forms the present invention is best described while referring to the drawings. In FIG. 1, there is shown a display module 1 according to a first preferred embodiment of the invention. The display module 1 includes a housing 2 formed from an impact resistant material, such as plastic, or the like. The display module 1 of FIG. 1 also includes a pair of liquid crystal displays. A first of such liquid crystal displays is a two-character alpha-numeric display 4 which has the capacity to display either letters or numbers. The second of such displays is a four-character alpha-numeric display 6 having a floating decimal point and the capacity to display only numbers. The operation of displays 4 and 6 to indicate the price of a shelf item will be described in greater detail hereinafter when referring to FIGS. 7-9 of the drawings. Although a pair of displays 4 and 6 are described, it is to be understood that a single display having a two-character alpha-numeric display at one end and a four-chamber alpha-numeric display at the opposite end may also be utilized herein.

Three electrically conductive, metal (e.g. nickel plated copper) contact strips 8, 9 and 10 are arranged in spaced, parallel alignment with one another along the front face of display module 1. The contact strips 8-10 function as electrical terminals and provide the important advantage of permitting a relatively easy and reliable electrical connection between display module 1 and a portable data terminal (designated 52 in FIG. 10). Contact strip 8 extends partially across the top of the front face of display module 1 to a first end thereof at which a push-button 12 is located. The purpose of push-button 12 will soon be described. Contact strip 9 extends through the approximate mid-point of the front face of display module 1. Contact strip 10 extends along the bottom of the front face of display module 1. Each of contact strips 9 and 10 extends partially across the front face of display module 1 toward the first end thereof at which a rectangular panel 14 is located. An advertising picture or photograph 16 of the shelf item with which the display module 1 is associated is attached to panel 14 below the push-button 12. Although the push-button 12 and advertising panel 14 are illustrated to be separate from one another, it is to be expressly understood that push-button 12 and advertising panel 14 can be integrated as a single membrane touch switch on which is located the panel 14 and the advertising picture 16 therewithin. Single membrane touch switches are commercially available and known to those skilled in the art.

Located between contact strips 8 and 9 is another rectangular panel 18 at which is affixed an adhesive backed label 20. Label 20 includes one or more of the identity and/or description of the shelf item and/or the UPC bar code and/or product number which corresponds to the shelf item. A liquid crystal display (e.g. 4 and 6) is located between contact strips 9 and 10 below the product identification label 20 and to one side of the advertising picture 16. Dividing the display is a separator bar 22 with indicia printed thereon to read FOR and $. As will soon become apparent, the indicia printed on display separator bar 22 is used by a consumer to read the information being visually displayed.

By virtue of displays 4 and 6 and the information appearing within panels 14 and 18, a consumer will be readily able to obtain a complete description and the corresponding price of the particular shelf item with which the display module 1 is associated. Moreover, consumer confusion can be avoided, because both the name and likeness of the shelf item appear on label 20 and picture 16 at close proximity to the shelf item. By virtue of the contact strips 8, 9 and 10, and according to an important advantage of the present invention, the information provided by module 1 and indicated by displays 4 and 6 can be quickly and easily updated (to reflect a price change, a quantity discount, a sale, etc.), so that the consumer will receive an accurate indication of price at the time of purchase.

Figure 2:
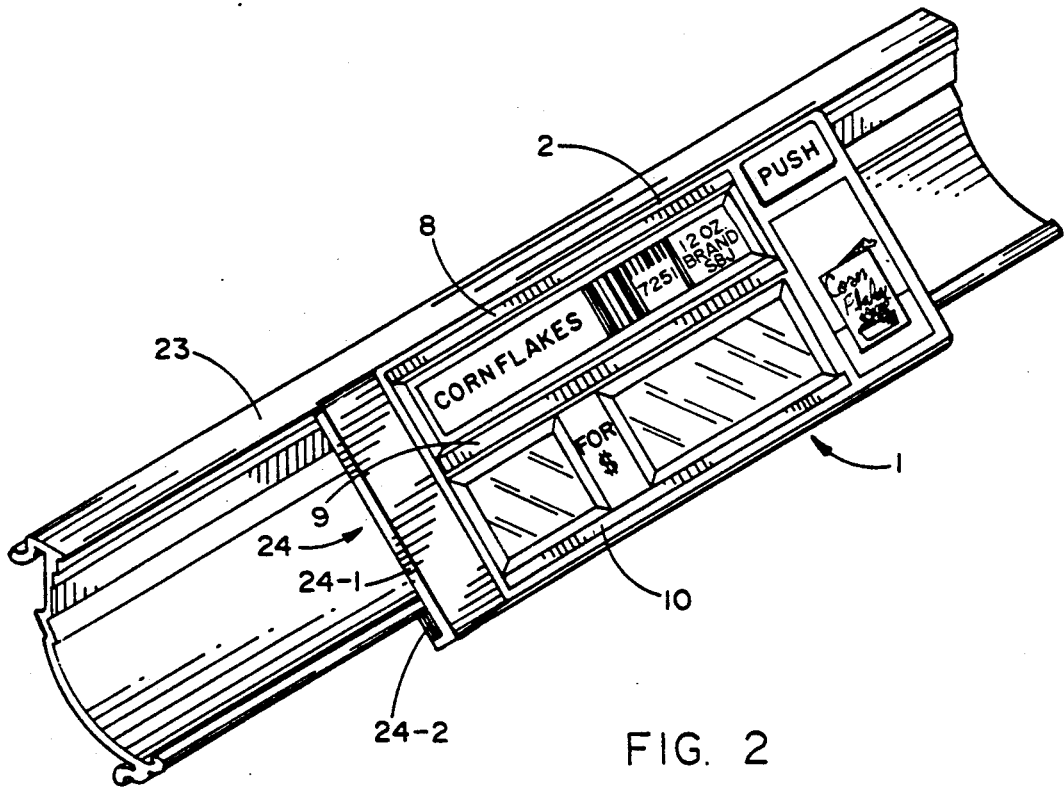
FIG 2 is an isometric view showing the display module of FIG. 1 securely attached to the facing of a shelf on which an item of merchandise is offered for sale.

FIG. 2 of the drawings shows the display module 1 secured to the facing 23 of a shelf on which an item of merchandise is to be located. Typically, the shelf to which module 1 is secured is found in a retail establishment, such as a grocery store, or the like. A one-piece U-shaped bracket 24 (best shown in FIG. 3) connects the display module 1 to the facing 23 and includes a pair of legs 24-1 and 24-2 which are held in spaced, parallel alignment with one another. Bracket 24 is preferably fabricated from aluminum or plastic. One of the legs 24-1 of bracket 24 is attached (e.g. screwed or glued) to the rear of the display module housing 2 (also best shown in FIG. 3). The bracket 24 is positioned so that the shelf facing 23 is received within the space between bracket legs 24-1 and 24-2. Two or more tamper-proof screws (designated 25 in FIG. 3) extend through the second of the legs 24-2 of bracket 24 in order to secure the combination bracket 24 and display module 1 to the facing 23. The tamper-proof screws are tightened against or released from the shelf facing 23 by a specially adapted tool, whereby to prevent the unauthorized removal of module 1 from facing 23.

Figure 3:
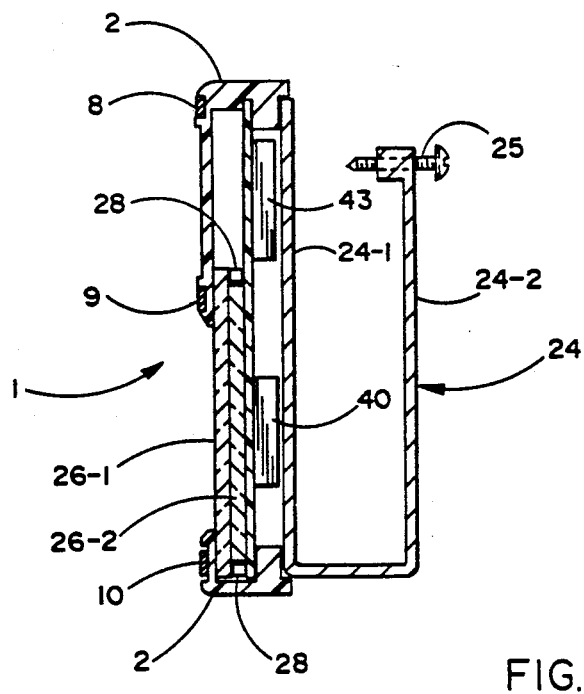
FIG. 3 is a cross-section of the display module of FIG. 1 showing the details of an associated bracket for attaching the module to the facing of a shelf.

FIG. 3 of the drawings shows the U-shaped bracket 24 affixed (e.g. glued or screwed) to the rear of the housing 2 of information display module 1. More particularly, and as previously described when referring to FIG. 2, one leg 24-1 of bracket 24 is attached to housing 2, and the second leg 24-2 is spaced from first leg 24-1 in order to receive the facing (23 in FIG. 2) of a shelf therebetween. Security screws 25 extend through bracket leg 24-2 to engage and retain the shelf facing between legs 24-1 and 24-2.

FIG. 3 also shows the arrangement of components of the information display module 1. Contact strips 8-10 extend across the front face of the housing 2 of display module 1. A pair of adjacent glass layers 26-1 and 26-2 are disposed between contact strips 9 and 10 to form either a single or a pair of liquid crystals displays (designated 4 and 6 in FIG. 1). A pair of conventional zebra strips 28 connects the glass layers 26-1 and 26-2 of the display to a printed circuit board 30. Also connected to the circuit board is a four-bit microprocessor 40 and a battery 43 which provides power to the microprocessor 40 and to circuit board 30. Microprocessor 40 and battery 43 will be described in greater detail when referring to FIG. 6.

Figure 4:
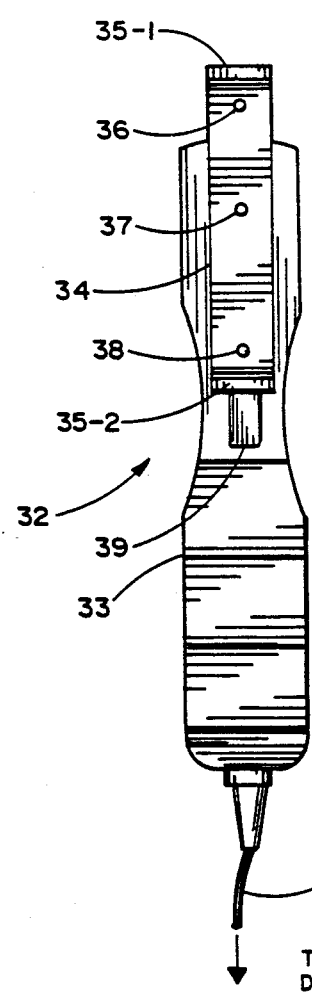
FIG. 4 is a front view of a multi-terminal connector which is adapted to be attached to the front face of the display module of FIG. 1.
Figure 5:
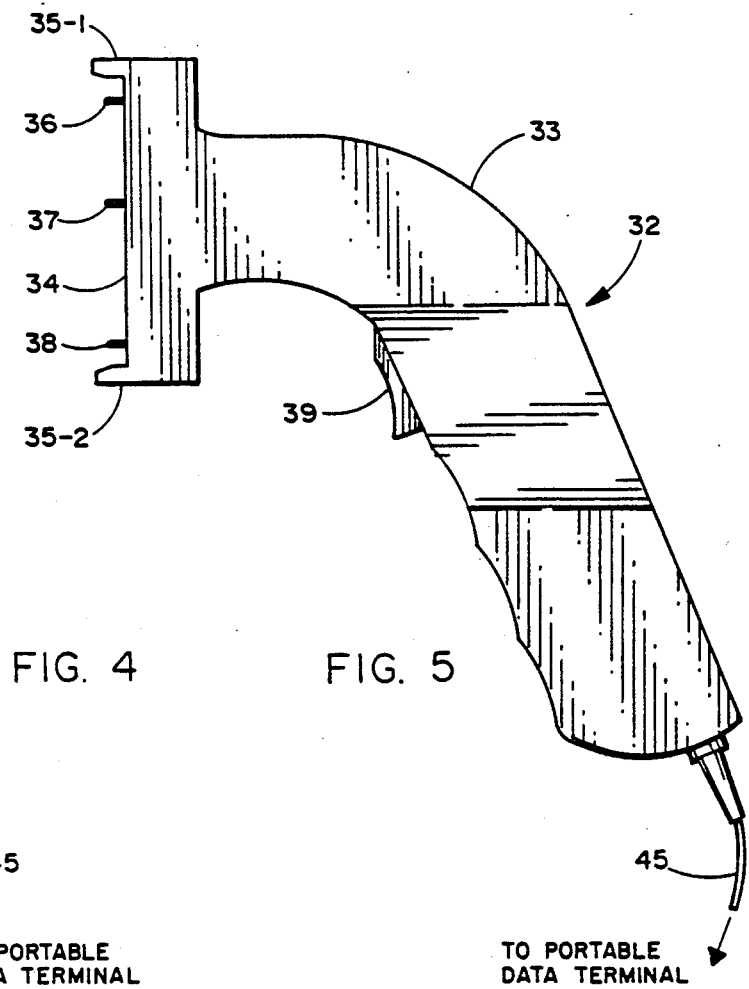
FIG. 5 is a side view of the connector of FIG. 3.

Referring to FIGS. 4 and 5 of the drawings, there is shown a multi-terminal electrical connector 32 by which to electrically connect an information display module 1 to a commercially available portable data terminal (designated 52 in FIG. 10) so that the information displayed by module 1 can be easily and accurately updated to reflect the current price of a shelf item. More particularly, the connector 32 includes a conveniently curved handle or grip portion 33. Handle portion 33 terminates at a generally flat head portion 34. Coextensively formed with head portion 34 and extending from opposite ends thereof are a pair of resilient guide lips 35-1 and 35-2 between which the front face of the display module is to be received. Three spring-loaded, electrically conductive (e.g. gold) contact pins 36, 37 and 38 project outwardly from the flat head 34 of connector 32. Contact pins 36-38 are spaced along the flat head 34 between opposite guide lips 35-1 and 35-2 to correspond with the spacing of the contact strips 8-10 (in FIG. 1) of the display module 1. A multi-conductor electrical cable 45 is connected to the contact pins 36-38 and extends through the handle 33 of connector 32 for connection at a receptacle of a portable data terminal (best illustrated in FIG. 10).

The resiliency of the guide lips 35-1 and 35-2 enables an integral clamp to be formed at the head 34 of connector 32. That is, the connector head 34 can be snapped into releasable engagement with an information display module, such that guide lips 35-1 and 35-2 will rotate slightly to accommodate and retain the display module therebetween. By virtue of the foregoing, a temporary interface is established between connector 32 and the information display module (1 in FIG. 1), such that the contact pins 36-38 of connector 32 will be aligned for engagement with the contact strips (8-10 in FIG. 1) of the display module. Connecting the cable 45 to a portable data terminal (illustrated in FIG. 10) and momentarily closing (i.e. depressing) a single pole, double throw trigger switch 39 projecting through the handle 33 of connector 32 permits the two-way transfer of information between a computer and the memory of the display module via a transmission path comprising the data terminal, cable 45, trigger switch 39, contact pins 36-38, and contact strips 8-10.

In order to update the stored information to be displayed to consumers from an information display module, a merchant, an inventory control officer, a clerk, or the like, attaches the connector 32 to the display module by snapping and/or sliding the flat head 34 thereover, such that the module is received between the guide lips 35-1 and 35-2 and the front face of the module is engaged by contact pins 36-38. When in the assembled relationship (of FIG. 10), the contact pins 36-38 of connector 32 are automatically aligned with the contact strips 8-10 formed across the front face of a display module. Because the contact strips 8-10 extend substantially across the front face of the module, a reliable electrical connection is made between contact strips 8-10 and contact pins 36-38 by simply attaching the connector 32 to the module in the manner just described and/or by sliding the connector head 34 in either direction across the face of the module.

Figure 6:
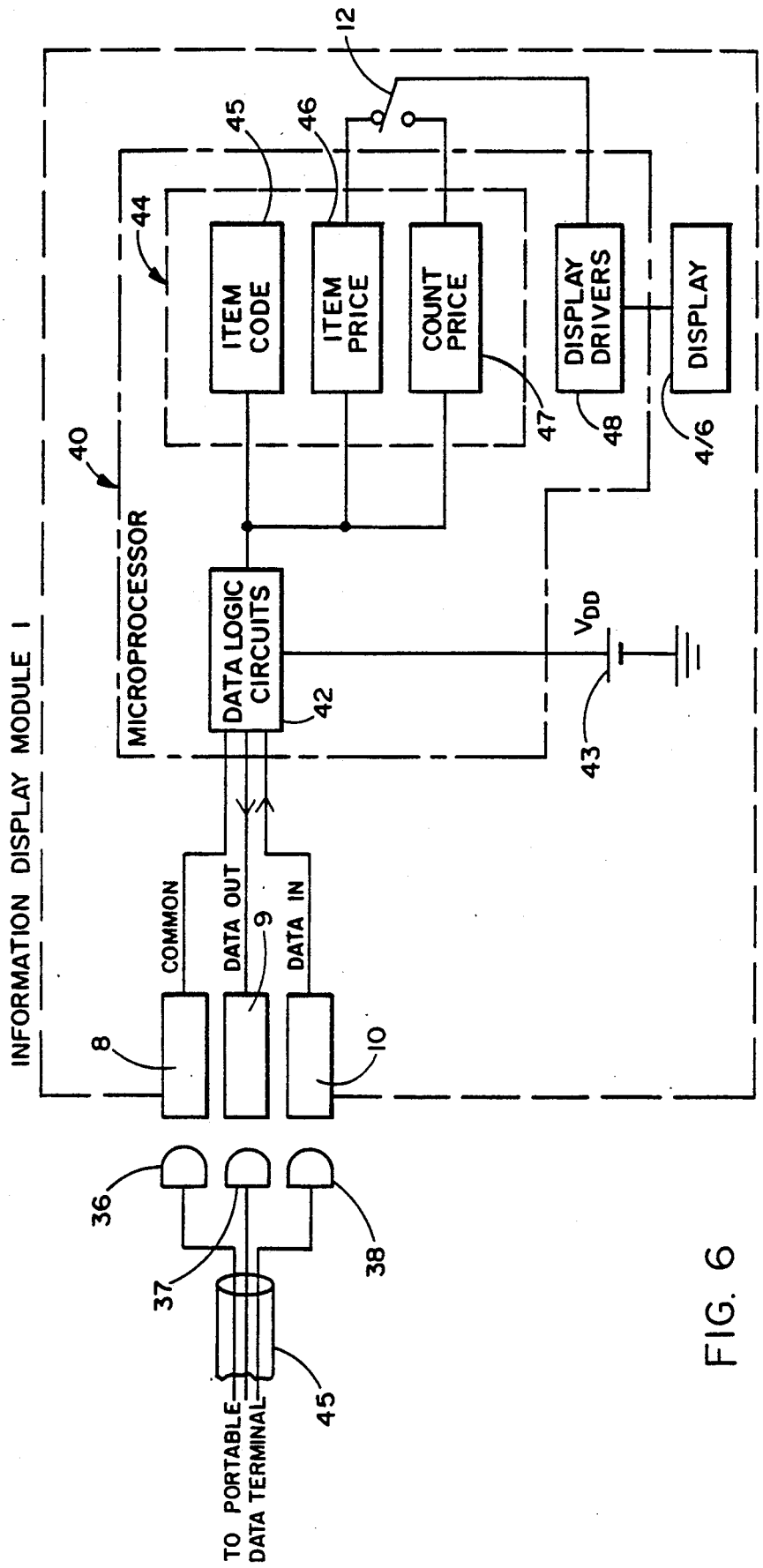
FIG. 6 is a block diagram to illustrate the electrical interconnection of the display module of FIG. 1 to a portable data terminal.

FIG. 6 of the drawings illustrates a block diagram which is representative of the interconnection established between information display module 1 and a portable data terminal when the contact pins 36-38 (of connector 32) are moved into engagement with the contact strip 8-10 of module 1 and the multi-conductor cable 45 is received at a suitable receptacle (designated 54 in FIG. 10) of the data terminal. According to a preferred embodiment of this invention, the logic 42, memory 44 and display drivers 48 of display module 1 are provided by a microprocessor 40. By way of example only, an available microprocessor 40 which has application herein is a 4-bit micro-computer known commercially as Part No. MSM65O2.

More particularly, microprocessor 40 includes data logic circuits 42 which interface the contact strips 8-10 with the memory 44 of module 1 in which price and related information is to be stored and updated. The data logic circuits 42 are powered by a single 1.5 or 3.0 volt lithium battery 43. One of the contact strips 10 supplies to memory 44 computer-generated information by way of the portable data terminal. A second control strip 9 supplies stored information (e.g. an indication of the UPC product bar code) from the memory 44 to the portable data terminal. Although separate contact strips 9 and 10 are shown and designated DATA OUT and DATA IN, respectively, it is to be understood that such contact strips may be replaced by a single contact strip for supplying information both to and from the memory 44. The third contact strip 8, designated COMMON, is connected to a suitable source of reference potential to complete the electrical circuit to logic circuits 42.

The memory 44 of the information display module includes an optional file 45 in which the UPC product bar code may be stored. Storing the bar code in the memory 44 will eliminate the necessity for printing the bar code on the label (20 in FIG. 1) which is affixed to the front of the information display module. Moreover, the bar code may be read automatically (i.e. by the portable data terminal) rather than manually. Memory 44 includes a second file 46 in which information corresponding to the price of the item of merchandise is stored. The information of memory file 46 is normally displayed to the consumer. Memory 44 also includes a third file 47 in which additional information regarding the item of merchandise is stored. As will be described in greater detail when referring to FIGS. 7-9, the additional information within file 47 may indicate cost per ounce, or the like. The previously described push button 12 may be depressed by the consumer to change the information displayed from the contents of memory file 46 to the contents of memory file 47. In this manner, the consumer will have easy access to different fields of information stored within memory 44.

Push button 12 is connected to the single or pair of displays 4 and 6 by way of the display drivers 48. Unless the push button 12 is depressed, the information displayed will correspond to the contents of memory file 46. Thus, the display drivers 48 are normally connected to memory file 46 by push button 12. A depression of push button 12 momentarily connects the display drivers 48 to memory file 47, so that the information displayed will then correspond to the contents of file 47.

Figure 7A:
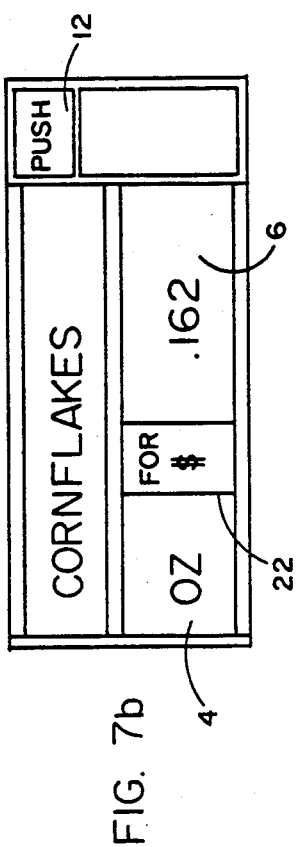
FIGS. 7a, 7b, 8a, 8b, 9a and 9b illustrate examples by which the information display module of FIG. 1 may be used to display the price and related information concerning an item of merchandise.
Figure 8A:
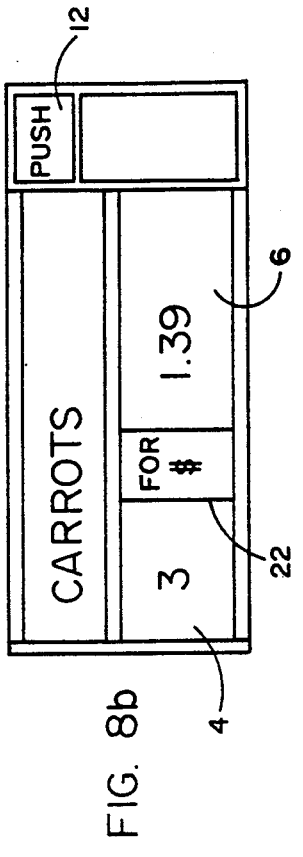
Figure 7B:
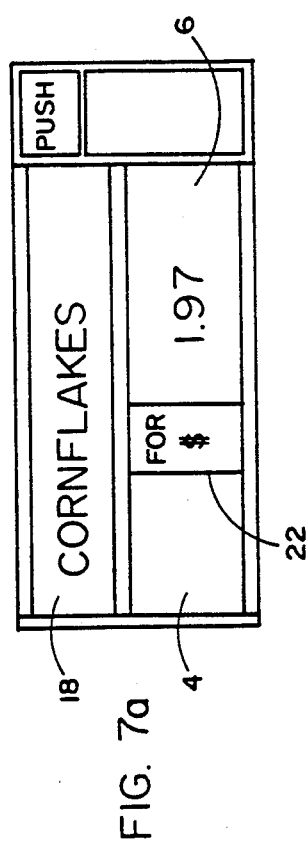
Figure 8B:
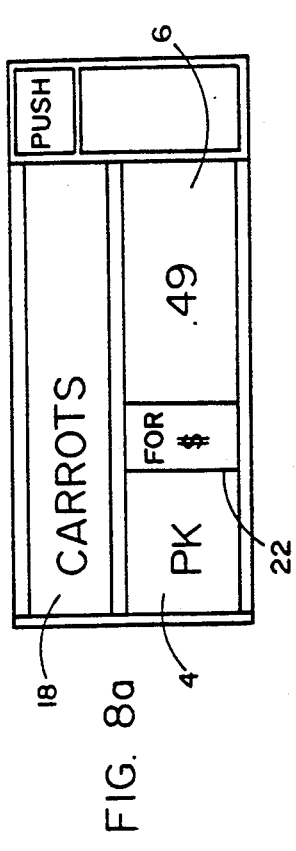

The use of the electronic display module of the present invention for displaying information regarding an item of merchandise is illustrated in FIGS. 7-9 of the drawings. In the example of FIG. 7a, the shelf item with which the display module is associated is a box of corn flakes. Accordingly, an appropriate product description (plus the UPC bar code and/or product number) is listed within panel 18. The alpha-numeric display 4 is initially blanked and the numeric display 6 gives the unit price of the item. Therefore, with the aid of display separator bar 22, the consumer may easily determine that a particular box of corn flakes sells for $1.97. For purposes of price comparison, and referring to FIG. 7b, the consumer depresses the push-button 12 to change the displays 4 and 6. The alpha-numeric display 4 now reads OZ (to designate ounces) and the numeric display 6 reads 0.162. With the aid of bar 22, the consumer may easily determine that the cost of the particular corn flakes is $0.162 for each ounce thereof. This information will enable the consumer to compare other brands of corn flakes by operating the price display modules associated therewith to find the best value per ounce. When the consumer releases the push-button 12, the displays 4 and 6 again provide the original information as shown in FIG. 7a.

In the example of 8a, the shelf item with which the display module is associated is a bag of carrots. Accordingly, an appropriate product description is listed within panel 18. The alpha-numeric display 4 initially reads PK (to designate package), and the numeric display 6 gives the unit price of the item. With the aid of the bar 22, the consumer may easily determine that a package of carrots sells for $0.49. In the event of a sale or quantity discount, and referring to FIG. 8b, the consumer depresses the push-button 12 to change the displays 4 and 6. The alpha-numeric display 4 now provides the numeral 3 and the numeric display 6 reads 1.39. With the aid of bar 22, the consumer may easily determine that three packages of carrots sell for $1.39.

In FIGS. 7 and 8, the items with which the display module is associated are commonly found in a grocery store. However, it is to be understood that the items so indicated are for purposes of example only, and, the present display module has application for displaying pricing and related information in other retail establishments. What is more, and as will be explained in greater detail hereinafter, the module is also suitable for use in hospitals and other health care facilities to display patient and other pertinent data regarding drug administration requirements and/or actions to be performed.

Figure 9A:
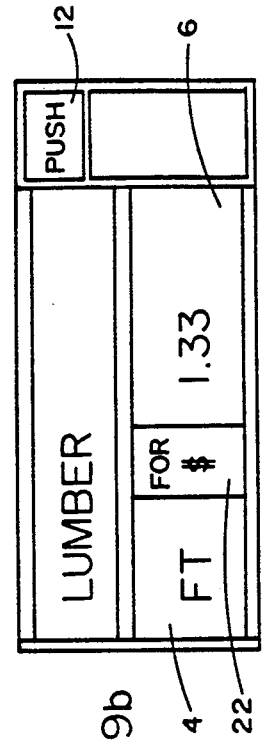
Figure 9B:
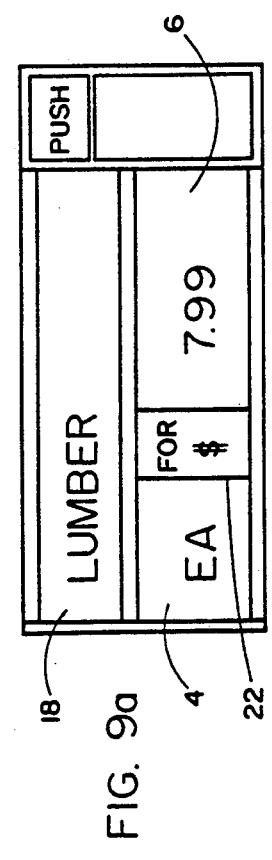

To this end, and referring to the example of FIG. 9a, the shelf item listed within panel 18 with which the display module is associated is a lumber boards, such as that found in a hardware store. The alpha-numeric display 4 initially reads EA (to designate each), and the numeric display 6 gives the unit price of each board of lumber. With the aid of bar 22, the consumer may easily determine that a lumber board sells for $7.99. Referring to FIG. 9b, the consumer depresses the push-button 12 to change the displays 4 and 6. The alpha-numeric display 4 now reads FT (to designate foot) and the numeric display 6 reads 1.33. With the aid of bar 22, the consumer may determine that the lumber board sells for an average price of $1.33 per foot. Accordingly, the particular letters and numbers displayed by the module will depend upon the purpose of the display and the corresponding computer generated information which is supplied by the aforementioned portable data terminal and stored in the memory of the display module.

Figure 10:
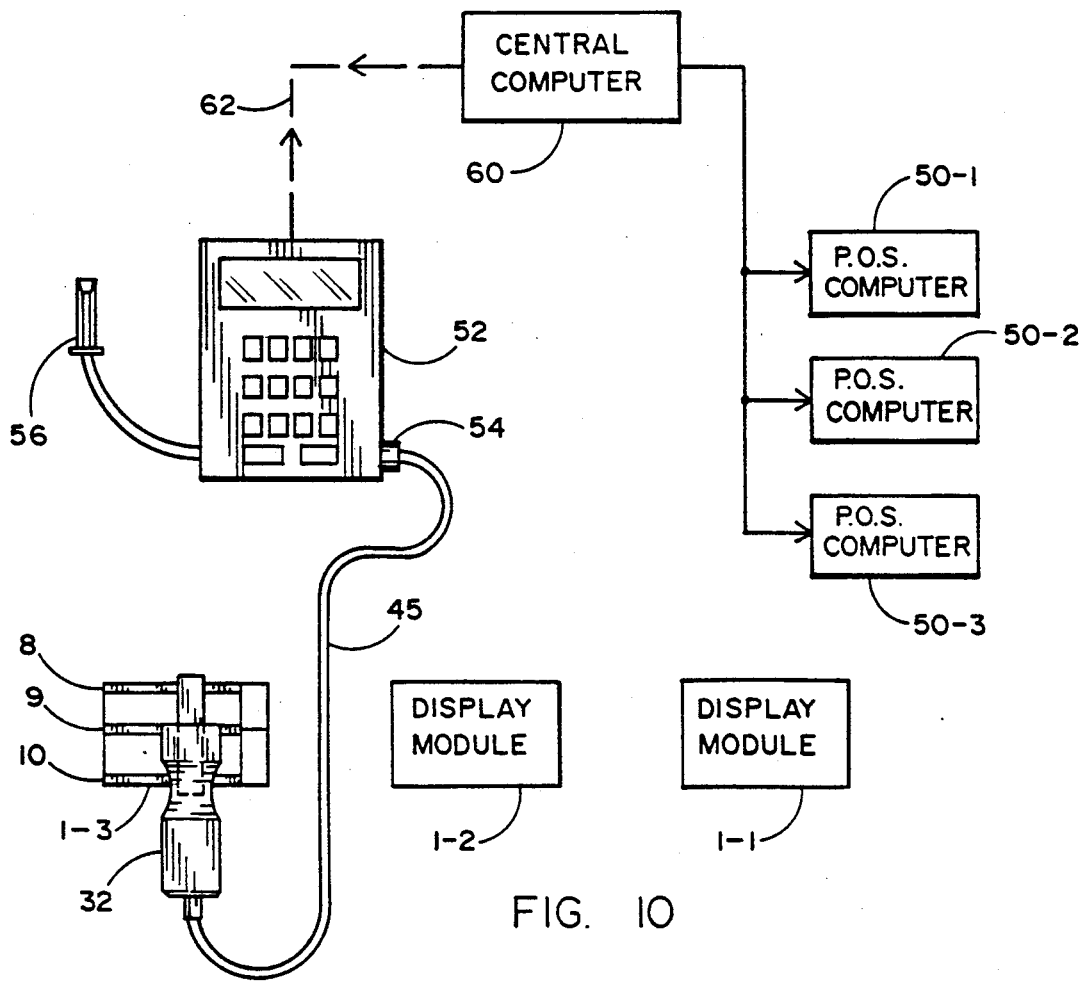
FIG. 10 is a block diagram showing a pricing system in which one of a plurality of display modules is selectively interfaced with a computer by way of a portable data terminal.

Use of the information display module of the present invention to provide a real time pricing system which electronically stores and displays data corresponding to items of merchandise located at any shelf, bin or location of a retail establishment (e.g. a grocery store or the like) is described while referring to FIG. 10 of the drawings, where a plurality of display modules 1-1, 1-2 and 1-3 are shown. Although only three modules are illustrated, it is, of course, to be understood that any number of modules may be included, depending upon the number of different items to be offered for sale. By virtue of the system to be described, computer generated pricing information which is programmed into the display modules 1-1, 1-2 and 1-3 will correspond with information programmed into the computer files at point of sale cash registers (e.g. 50-1, 50-2 and 50-3), such as those commonly found at the check out stand of a market, whereby to greatly reduce the possibility that the price indicated at the shelf or bin will be different from the price printed out for the consumer during check out.

It was previously disclosed that the display modules 1-1, 1-2 and 1-3 are independent, stand-alone devices which require no permanent (e.g. hard wire) connections to a computer source. Therefore, updating the price information stored in the memory of modules 1-1, 1-2 and 1-3 is accomplished by connecting a portable data terminal 52 to one of the modules to be selected from the plurality thereof. One commercially available hand-held, portable data terminal 52 which is suitable for connection to the price display module of the present invention is Model 1400 manufactured by MSI Corporation of Irvine, California. The portable data terminal 32 is electrically connected to a selected information display module (e.g. 1-3) by first attaching the multi-terminal connector 32 to the front face of module 1-3 and then connecting the multi-conductor cable 45 of connector 32 to a receptacle 54 (e.g. an RS232 serial port) of the data terminal.

Activation of a down load procedure to supply computer-generated information from portable data terminal 52 to one of the price display modules 1-1, 1-2 or 1-3 is initiated by scanning the UPC bar code located at the face of the display module with a bar code reader 56 of data terminal 52, so as to determine the particular item to be price updated. Of course, if the bar code is initially stored in the memory of the module, as previously disclosed when referring to FIG. 6, such information is automatically transferred to data terminal 52 and use of bar code reader 56 will, therefore, be unnecessary. An acknowledgement signal is supplied from the display module to the portable data terminal 52 for later verification at the central computer 60. The acknowledgement signal is generated by the display module after the memory thereof has been updated to reflect the pricing information supplied from central computer 60.

The predetermined pricing information which is down loaded into the memory of the selected price display module 1-3 for storage and eventual display originates at the central computer 60. Central computer 60 may be located either on-site or at a remote site (e.g. at a warehouse) so that one computer may exercise control over several retail establishments. The central computer 60 communicates with and updates the portable data terminal 52 by way of a two-way data link 62 (e.g. either directly or via a MODEM and the telephone lines). Information, corresponding to the acknowledgement signals generated after the memories of the price display modules 1-1, 1-2 and 1-3 have been updated are supplied over the data link 62 from data terminal 52 to the central computer 60, so that the computer may maintain a record to assure that all required price changes have been made in and acknowledged by the modules of the pricing system. Therefore, any price change which is inadvertently overlooked or forgotten will be recorded in the computer 60.

The central computer 60 also communicates with each of the point of sale computers (i.e. cash registers) located at the retail establishment. Therefore, the same predetermined pricing information is provided by computer 60 to the display modules 1-1, 1-2 and 1-3 (by way of portable data terminal 52) and to the point of sale computers 50-1, 50-2 and 50-3. In this manner, the price displayed to the consumer at the shelf and printed at check out will be identical, whereby to avoid customer confusion and the possibility of overcharging.

As previously indicated, the information display module (designated 1 in FIG. 1) of this invention may also have application in a hospital, as well as a retail establishment. More particularly, a program to administer medication to hospital patients may be controlled by attaching a personal bar code to each patient's wrist. This same bar code, as well as information regarding medication and patient status, are then down loaded into the memory of the display module using the hand-held portable data terminal (designated 52 in FIG. 10). By locating the display module in the patient's room, important information such as patient status, last medication administered and future medication and/or treatment required may be visually displayed to hospital personnel.

The portable data terminal 52 is used by a hospital in a similar manner to the system illustrated in FIG. 10 and used by a retail establishment. Thus, hospital personnel may update the memory of the display device whenever treatment or medication is administered to a patient. That is to say, the patient's bar code and the bar code associated with his medication are scanned by the bar code reader 56 of the portable data terminal. The data terminal and the display module are electrically interconnected via cable 45, so that the scanned information can be down loaded into the memory of the module. An acknowledgement signal is generated by the module and stored in the data terminal for subsequent loading into a central computer 60 over data link 62. By virtue of the foregoing, doctors and surgeons may obtain current data relating to patient status and medication via a conventional MODEM and a telephone.

Figure 11:
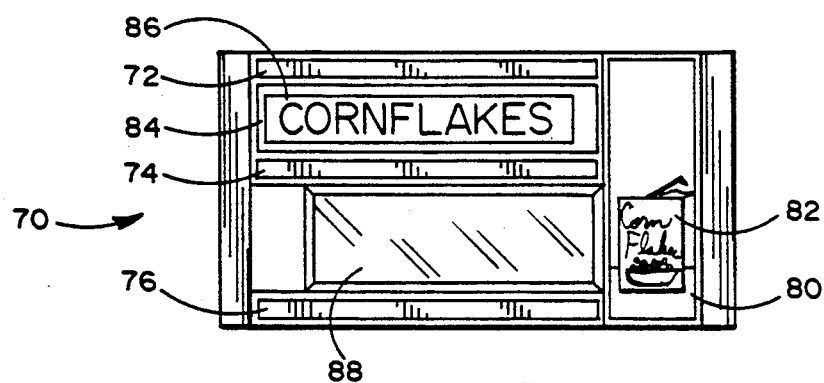
FIG. 11 shows an information display module formed in accordance with an alternate embodiment of the present invention.

An electronic information display module 70 which is formed in accordance with an alternate embodiment of the present invention is shown in FIG. 11 of the drawings. Like the display module of FIG. 1, module 70 has three parallel aligned electrical contact strips 72, 73 and 74 extending along the face thereof. The contact strips 72-74 permit the memory of display module 70 to be easily updated by using the connector that was previously disclosed when referring to FIGS. 4 and 5. Each of the contact strips 72-74 extends partially across the front face of display module 70 to one end thereof at which is located a rectangular advertising panel 80. A picture 82 or photograph of the associated shelf item is attached to module 70 within the advertising panel 80.

Located between contact strips 72 and 74 is another rectangular panel at which is affixed an adhesive backed label 86. Label 86 contains the identity of the shelf item, including the bar code, product name and/or product number thereof. Located between contact strips 74 and 76 is a single, five character numeric, liquid crystal display 88 with a fixed decimal point. A display module 70 having the display 88 is preferable when it is desirable to display a single field of stored information, such as that relating only to the price of an item of merchandise. The technique for interconnecting information display module 70 in a computer controlled pricing system by means of a multi-terminal connector (e.g. 32 in FIGS. 3 and 4) and a hand-held portable data terminal (e.g. 52 in FIG. 10) is identical to that previously disclosed when referring to the information display module 1 of FIG. 1.

By virtue of the present invention, a quick and reliable temporary connection of a data generating and/or transmitting machine (e.g. a computer or a portable data terminal) may be easily made to a remotely located information display module at a retail store or a hospital. The disclosed multi-terminal connector eliminates the need for locating correct pin orientations on standard connectors and for locating standard connector receptacles on the remote display module, whereby to conserve space and reduce design complexity of the module. Moreover, the connector also reduces the time to electrically and mechanically connect and disconnect the display module in a computer-controlled pricing system to minimize the cost and complexity of implementing and maintaining said system.

It will be apparent that while a preferred embodiment of the invention has been shown and described, various modifications and changes may be made without departing from the true spirit and scope of the invention.

Having thus set forth a preferred embodiment of the invention, what is claimed is:

1. In combination,
an information display device having
  (a) a housing defining spaced edge surfaces on the exterior thereof,
  (b) a memory connected to said housing for storing information,
  (c) display means connected to said housing and interfaced with said memory for visually displaying the information stored therein, and
  (d) first electrical contact means on the exterior of said housing and operatively connected to said memory; and
a portable data terminal for supplying information to said memory, said terminal including,
  (e) a face for presentment to the housing,
  (f) second electrical contact means on said face engageable in abutting relationship with said first contact means,
  (g) guide means on said terminal adjacent said face and operable in cooperation with said edge surfaces as said face is presented to said housing to guide the position of said face so that said second electrical contacts come into abutting electrically conductive relationship with said first contacts.

2. The combination recited in claim 1, wherein said display means has a switch interconnected therewith, the activation of said switch changing the information displayed from certain information stored in the memory of said information display device to certain other information stored therein.

3. The combination recited in claim 1, wherein said information display device also has a picture attached thereto of an item to which the information stored in the memory of said display device relates.

4. The combination recited in claim 1, wherein the first electrical contact means of said information display device comprises a plurality of electrically conductive strips extending along said housing and interconnected with the memory.

5. The combination as in claim 4, wherein the second contact means of said terminal comprises a plurality of electrical contact elements that are aligned for engagement with respective ones of said plurality of conductive strips when said terminal face is presented to said housing.

6. In combination, a shelf for support products, an information display device mounted on said shelf and having
  (a) a housing defining spaced edge surfaces on the exterior thereof,
  (b) a memory connected to said housing for storing information,
  (c) display means connected to said housing and interfaced with said memory for visually displaying the information stored therein, and
  (d) first electrical contact means on the exterior of said housing and operatively connected to said memory; and a portable data terminal for supplying information to said memory, said terminal including
  (e) a face for presentment to the housing,
  (f) second electrical contact means on said face engageable in abutting relationship with said first contact means, and
  (g) guide means on said terminal adjacent said face and operable in cooperation with said edge surfaces as said face is presented to said housing to guide the said second electrical contacts come into abutting electrically conductive relationship with said first contacts.

7. The combination as in claim 6, wherein the first electrical contact means of said information display device comprises a plurality of electrically conductive strips extending along said housing and interconnected with the memory.

8. The combination as in claim 7, wherein the second contact means of said terminal comprises a plurality of electric contact elements that are aligned for engagement with respective ones of said plurality of conductive strips when said terminal face is presented to said housing.

* * * * *